INVENTORS
JEAN BAUDRY
JEAN CHOPIN
BY Krafft & Wells
ATTORNEYS 3,382,850
APPARATUS FOR THE CONTROLLED COMBUSTION OF LEAN MIXTURES IN INTERNAL COMBUSTION ENGINES
Jean Baudry and Jean Chopin, Rueil-Malmaison, France, assignors to Institut Francais du Petrole des Carburants et Lubrifiants, Rueil-Malmaison, Seine-et-Oise, France
Filed Dec. 20, 1965, Ser. No. 514,844
Claims priority, application France, Dec. 23, 1964, 999,852
2 Claims. (Cl. 123—32)

ABSTRACT OF THE DISCLOSURE

An internal combustion engine having a spark plug ignition and which is fed by two fuel currents of different degrees of richness controlled by a single admission valve, the improvement comprising an engine having a prechamber of small volume containing only the spark plug electrode, the prechamber communicating with the principal chamber by a passageway of limited cross-section and the end of the inlet pipe for the richer fuel being adapted to direct the latter toward an orifice in the prechamber when the valve is in its open position.

---

The present invention relates to an improvement in internal combustion engines having controlled ignition.

It is an object of the present invention to provide an improved internal combustion engine of the controlled ignition type and operated with a heterogeneous feed.

Another object of the invention is to provide for the combustion of heterogeneous hydrocarbon mixtures where the air-fuel mixture has a fuel proportion less than that of a stoichiometric mixture. A richness of unity corresponding to stoichiometric proportions may be defined for air as the combustion sustaining agent and hydrocarbons as the fuel, by a ratio of about 15 g. air per g. of hydrocarbon where the proportions vary somewhat with the nature of the fuel.

The combustion of lean mixtures can be rendered more complete than that of rich mixtures which burn only imperfectly.

The use of lean mixtures can therefore offer numerous advantages over the use of rich mixtures, especially in:

(1) fuel economy;
(2) reduction of the amount of escaping harmful unburned gas; and
(3) reduction in the amount of calamine deposits in the engine, such deposits resulting from a bad combustion.

In controlled ignition engines, the difficulty results mainly from the fact that it is hardly possible to burn under favorable conditions homogeneous hydrocarbon mixtures of which the richness is below a limiting value of the order of 0.80, this limiting value depending somewhat on the operating conditions of the engine.

Among the previously suggested solutions of the prior art for overcoming this difficulty, one suggestion has been to separate the combustion space into substantially two communicating portions, a principal combustion chamber and a precombustion chamber with the ignition electrodes located in the latter.

In order to feed a richer fuel mixture into the precombustion chamber than into the principal combustion chamber, an admission valve or an injector feeding into the interior of the precombustion chamber is used.

The spark plug ignition of the richer mixture in the prechamber permits the combustion of the lean mixture contained in the principal chamber.

The present inventors have found that feeding a prechamber with a mixture richer than that of the principal chamber can be effected without feeding the richer mixture directly into the prechamber itself.

According to the present invention, there is provided an internal combustion engine of the spark ignition type, having at least one cylinder, means for feeding said cylinder with two streams of air-fuel mixture having different richnesses, forming in the combustion space an heterogeneous mixture, this engine being characterized in that the combustion space contains a prechamber of small internal volume which encloses exclusively the electrodes of the spark plug and is provided with at least one orifice for communication with the remainder of the combustion space, which constitutes the principal chamber, said prechamber being positioned at a place of said combustion space around which the richness of the air-fuel mixture is greater than the average richness of said mixture in the whole combustion space.

Under these conditions the richness of the mixture in the prechamber is substantially the same as that of the portion of the principal chamber located in the neighborhood of the orifice or orifices of the prechamber. Such a prechamber might then appear useless, since the use of a prechamber has been contemplated in the prior art exclusively for maintaining in the neighborhood of the spark plug electrodes a mixture that is richer than that which is in the principal chamber, even in the proximity of the prechamber.

It has, however, been observed that while operating under the above mentioned conditions and using a prechamber that is not fed directly with a combustible in combination with a heterogeneous feeding of the principal combustion chamber, it is possible to bring down the lower limit of average richness in the combustion space (chamber plus prechamber) to a level which is lower than that permitted by heterogeneous feeding in the absence of a prechamber and thereby to operate the engine with mixtures substantially leaner than in the absence of the prechamber.

The prechamber used according to this invention should be of a type only slightly open, the best results being obtained when the orifice or orifices of this prechamber offer between the prechamber and principal chamber a passageway whose cross section is not greater than half of the area of that part of the outside wall of the prechamber which is in contact with the gas in the principal chamber.

The reterogeneous feeding of the principal combustion chamber under the conditions of the invention can be advantageously accomplished by using the procedure described in U.S. Patent 3,087,480 without thereby limiting this invention to the specific heterogeneous feeding method for the combustion chamber set forth in the reference patent.

This method comprises admitting into the combustion chamber of an engine two streams of different degrees of richness (of which the poorer one can be air), by means of two channels of which the orifices are simultaneously uncovered by a single valve during the suction stroke. According to this process the admission channel for the richer stream is terminated by a tube orienting said stream toward the electrodes of the spark plugs.

When the apparatus of the present invention is used with the method of U.S. Patent No. 3,087,480 the electrodes of the spark plugs are placed in a prechamber of small internal volume having at least one orifice located substantially in the flow path of the rich mixture directed toward the electrodes.

Such an example of this invention will be described more in detail below, with reference to the annexed figures of the drawing in which.

Figure 1:
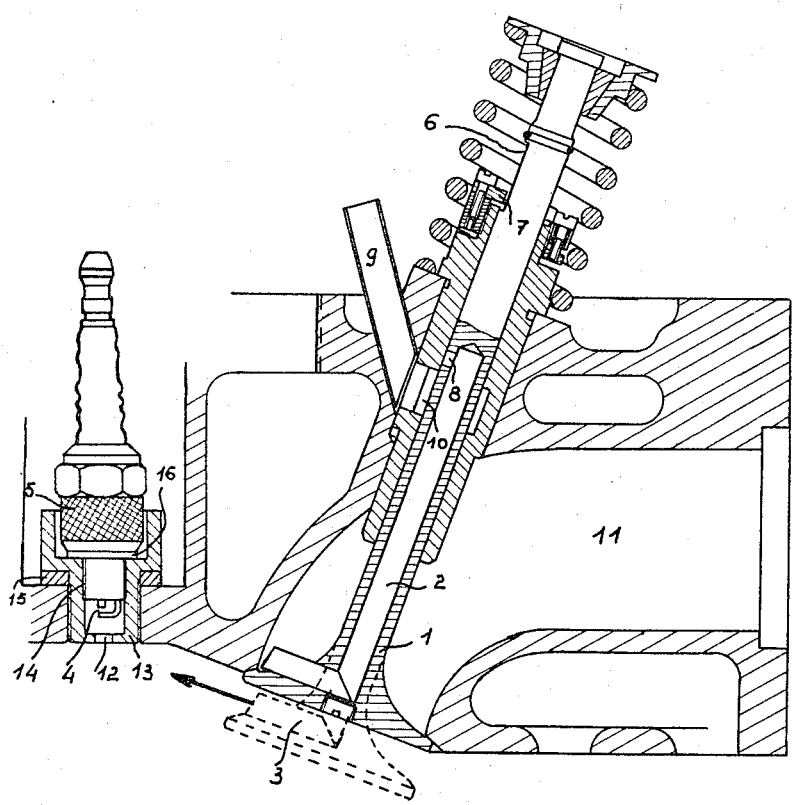
FIGURE 1 shows in cross section one form of this invention.

In the embodiment shown in FIGURE 1, heterogeneous feeding is effected by the method described in U.S. Patent 3,087,480 by using a valve of the kind described in the U.S. patent application Ser. No. 435,427.

This valve 1 has an internal channel 2 coaxial with the valve stem, and extending laterally in the valve head as a radial passageway 3.

The channel 2 communicates with the channel 9 to deliver the rich mixture by means of orifices 8 and 10 when they are registering namely when the valve is in its open position. The lug 7 fitting against the flat portion 6 of the valve stem prevents rotation of the latter.

By this way the radial channel 3 always keeps its orientation in the same direction. In the open position of the valve shown in dotted lines, according to this invention the channel 3 is directed toward the small opening 12 in the bottom of the small prechamber 13 whose volume is small in comparison with the total volume of the cylinder, and in which the electrodes 4 of the spark plug 5 are positioned. The prechamber in this case is cylindrical.

The volume of the free space around the electrodes can, for example, be of the order of 0.7 cm.³ for a dead cylinder volume of the order of 73 cm.³ and the diameter of the orifice 12 is about 4 mm., where these values are given only as examples.

The surface of the portion of the exterior wall of the prechamber 13 which is in contact with the gas in the principal chamber is in the present construction that of the base of this prechamber 13 in which the orifice 12 is located. The remainder of the exterior wall of this prechamber is in effect enclosed in the cylinder head.

It has, however, been determined experimentally that best results are obtained with a free volume inside the chamber 13 which is not greater than 10% of the total volume of the cylinder (with the piston at its upper dead center), and preferably less than or equal to 5%, e.g. about 2%.

The inlet channel 11 is for the delivery of a lean fuel mixture or air.

Figure 2:
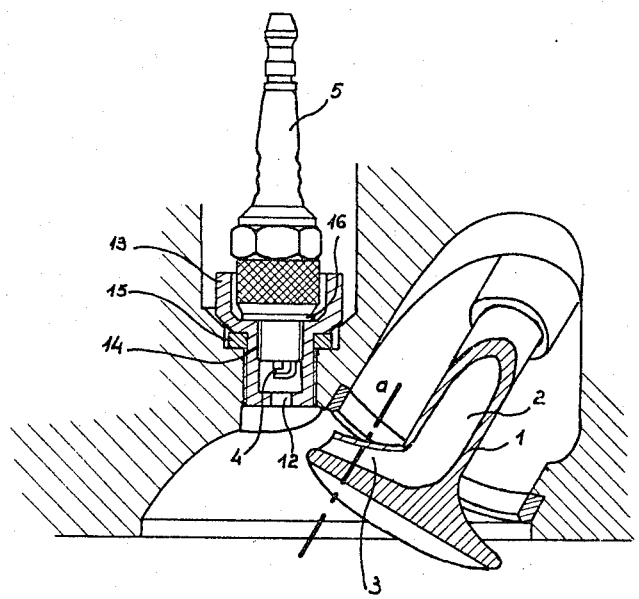
FIGURE 2 shows in cross section a modification.
Figure 2A:
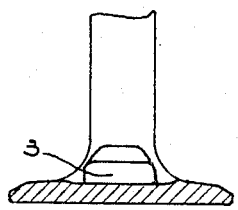
FIGURE 2a shows in cross section a detail on the line a of FIGURE 2.

The passageway 3 in the head of the valve can be inclined relative to a plane perpendicular to the axis of channel 2, as in the construction of FIGURE 2. The discharge end of the passageway 3 can have different forms, as e.g. the form of a duck bill, as shown in FIGURES 2 and 2a which gives a stream of rich mixture of reduced thickness for substantially the same amount of this mixture.

The bottom of the chamber 13 can be flat, as shown, or can be conical inside, or have any other form. The chamber 13 can also have more than one opening 12 in its wall.

In the construction of FIGURE 1, the chamber 13 is formed as a separate element from the spark plug 5, the latter being provided with screw threads 14 and with the interposition of a seal joint 16. The chamber 13 is itself screwed into the wall of the cylinder head, the seal joint 15 assuring fluid tightness. It is understood, however, that without departing from this invention, it is also possible to use spark plugs of special construction in which the electrodes are contained in a chamber of small internal volume with one or more openings of small diameter provided in the chamber base.

The prechamber can also be in the form of a cavity in the cylinder head.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example

Experimental results obtained show the progress that has been made with this invention over the results obtained by the method of U.S. Patent No. 3,087,480.

In a series of experiments, the lower limits of total richness $R_{gm}$ reached without adverse functioning of the engine were determined.

In order to obtain standard values for comparison, a maximum limit value of the content of unburned hydrocarbons in the escaping gas was settled. This content has been measured by means of a very sensitive conventional apparatus known as a "detector by ionizing flame."

In such a detector the gas to be analyzed is introduced at a constant rate into a pilot flame (of hydrogen) to produce an ionization between two electrodes positioned in the flame. Prior to these tests, the detector was calibrated with a gas containing different amounts of hexane.

The hydrocarbon content of the exhaust gas is then expressed as p.p.m. (parts per million) of hexane, representing the amount of hexane which would produce the same ionization current as the mixture being tested.

The experiments were conducted on one cylinder of a four cylinder engine running at 3000 r.p.m. The feeding and operating conditions of three of the cylinders, functioning at full admission, were kept substantially constant throughout the experiments.

The fourth cylinder was fed with a hydrocarbon mixture according to the method of U.S. Patent No. 3,087,480 with a feeding rate very close to the rate at full admission when the cylinder is fed conventionally with a homogeneous hydrocarbon mixture.

Each test was performed by varying in this last cylinder the total richness of the hydrocarbon mixture while keeping unchanged the degree of heterogeneity H of the latter defined as the ratio of the amount of hydrocarbon introduced into the rich mixture to the total amount of hydrocarbon consumed.

In this manner a determination was made of the minimum value $R_{gm}$ of the total richness of the hydrocarbon mixture with which it is possible to keep the hydrocarbon content in the exhaust gas of the fourth cylinder at a value not exceeding that which would be equivalent to 500 p.p.m. of hexane.

This determination of $R_{gm}$ was made twice for each value of the degree of heterogeneity H.

A first time under the conditions corresponding to the method of U.S. Patent No. 3,087,480 but without use of the improvement forming the object of the present invention (value of $R_{gm}$ given in columns (a));

A second time, under identical conditions, but with the improved apparatus of the present invention shown in FIGURE 1 and with the following numerical characteristics; free volume of the prechamber: 0.7 cm.³ for a total cylinder volume of 73 cm.³ and an orifice 12 having a diameter of 4 mm. (value of $R_{gm}$ given in columns (b)).

TABLE

| H | 10% | | 20% | | 35% | | 50% | |
|---|---|---|---|---|---|---|---|---|
|  | a | b | a | b | a | b | a | b |
| $R_{gm}$ | 0.76 | 0.74 | 0.75 | 0.66 | 0.71 | 0.65 | 0.67 | 0.64 |

For comparison purpose the feeding of the cylinder with a combustible mixture according to the conventional method whereby the principal combustion chamber is fed with a homogeneous hydrocarbon mixture, does not permit, under the same conditions as in the preceding tests, any diminution of the richness of the hydrocarbon mixture below 0.80. In practice, the provision of a chamber of small volume around the spark plug electrodes without the use of a heterogeneous feeding will also not permit this limit to be lowered.

The preceding table shows the improvement resulting from the use of this invention.

From the foregoing description, one skilled in the art can easily ascertain the essential characteristics of this invention, and without departing from the spirit and scope thereof, can make various usages and conditions. Consequently, such changes and modifications are properly, equitably, and intended to be, within the full range of equivalence of the following claims.

What is claimed is:

1. An internal combustion engine with controlled spark plug ignition having a combustion chamber that is provided with a fuel admission system comprising first and second gaseous fuel feed channels, said first channel having a rich gaseous fuel mixture, and a fuel admission valve that is common to both gaseous currents, the end of said first channel for the rich mixture adapted to direct the rich mixture effectively toward the site of spark plug ignition when said valve is in open position, said combustion chamber having a given volume at the end of compression, in combination with a prechamber surrounding the spark plug electrode and containing the electrode alone, said prechamber having an internal volume less than ten percent of said given volume and communicating with said combustion chamber by a passageway including at least one communicating orifice which is situated with said valve in its open position substantially and directly in alignment with said end of the first channel for the rich gaseous fuel mixture, said prechamber being provided with an exterior wall having a given area in contact with gas in the combustion chamber and said passageway has a cross-sectional area which is equal to not more than about half of said given contact area.

2. The internal combustion engine of claim 1, wherein said internal volume of the prechamber is less than five percent of said given volume.

References Cited

UNITED STATES PATENTS

| | | | |
|---|---|---|---|
| 1,799,397 | 4/1931 | Taylor et al. | 123—127 |
| 1,803,461 | 5/1931 | Claudel | 123—127 |
| 2,242,990 | 5/1941 | Brown | 123—75 |
| 3,087,480 | 4/1963 | Baudry | 123—119 |
| 3,124,113 | 3/1964 | May et al. | 123—75 |
| 3,174,470 | 3/1965 | Von Seggern et al. | 123—75 |
| 3,213,839 | 10/1965 | Gitlin et al. | 123—75 |
| 3,283,751 | 11/1966 | Goossak et al. | 123—119 X |

LAURENCE M. GOODRIDGE, *Primary Examiner.*